United States Patent [19]

Schmitt et al.

[11] Patent Number: 4,845,162

[45] Date of Patent: Jul. 4, 1989

[54] CURABLE PHENOLIC AND POLYAMIDE BLENDS

[75] Inventors: George J. Schmitt, Madison; Dusan C. Prevorsek, Morristown; Hong B. Chin, Parsippany; Kwok W. Lem, Randolph, all of N.J.

[73] Assignee: Allied-Signal Inc., Morris Township, Morris County, N.J.

[21] Appl. No.: 56,100

[22] Filed: Jun. 1, 1987

[51] Int. Cl.$^4$ ............................................. C08L 77/00
[52] U.S. Cl. ..................................... 525/423; 525/143; 525/429; 525/454; 525/456; 525/484; 525/495; 525/497; 525/498; 525/903; 527/206; 527/303; 527/315
[58] Field of Search ............... 525/423, 429, 903, 143, 525/454, 456, 484, 495, 497, 498; 527/206, 303, 315

[56] References Cited

U.S. PATENT DOCUMENTS 3,336,415  8/1967  Kennedy ............................ 525/423

FOREIGN PATENT DOCUMENTS 006180  3/1967  Japan .
028199  3/1976  Japan .

*Primary Examiner*—Theodore E. Pertilla
*Attorney, Agent, or Firm*—Richard C. Stewart; Gerhard H. Fuchs

[57] ABSTRACT

The present invention relates to a composition comprising a phenolic resin, as for example phenol formaldehyde, an active hydrogen containing polymer as for example a polyamide, and a curing agent, such as a polyepoxide.

42 Claims, No Drawings

CURABLE PHENOLIC AND POLYAMIDE BLENDS

BACKGROUND OF THE INVENTION

1. Field of the Invention

This invention relates to a novel polymeric composition. More particularly, this invention relates to curable compositions comprising blends of one or more phenolic resins, one or more thermoplastic polymers having active hydrogens, and one or more curing agents which are capable of curing the phenolic resins and capable of reacting with the reactive hydrogens of said polymer forming an interpenetrating network in which the polymers are linked to the cured resins by way of the residues of the curing agents.

2. Prior Art

Phenolic resins are a class of synthetic materials that are produced by the reaction of phenols with aldehydes. The starting materials for use in the manufacture of phenolic resin which are used in greatest volume are phenol and formaldehyde. Other important phenolic starting materials include alkyl-substituted phenols such as cresols, xylenols, p-tert-butyl-phenol, p-phenylphenol, nonylphenol, and the like. Also diphenols, e.g., resorcinol (1,3-benzenediol) and bisphenol-A [bis-A or 2,2-bis(4-hydroxylphenyl)propane], are used in smaller quantities for applications requiring special properties. In addition to formaldehyde, acetaldehyde or furfuraldehyde are also employed as aldehyde starting materials, but in much smaller quantities. The greater latitude in molecular structure for phenolic resins, has resulted in an array of physical properties for these resins allowing use in a larger number of applications.

Key innovations in early phenolic resin manufacture included control of the molecular structure and the use of heat and pressure to achieve desirable properties. Studies in the use of acidic or basic catalysts and of changes in the molar ratio of formaldehyde to phenol resulted in the definition of two classes of phenolic resins, namely novolac or novolak resins and resol resins. Resol resins are made with a molar excess of formaldehyde under alkaline conditions. Novolac resins are normally prepared with a molar excess of phenol under acidic conditions. Thus novolacs are thermoplastic and require an additional curing agent, the most common being hexamethylene-tetraamine. Other least common curing agents are materials such as epoxy, isocyanate and, carboxylic acid containing compounds which can react the active hydrogen atom in the hydroxyl group present in phenolic resins.

Phenolic resins have many uses because of their excellent properties such as electrical properties, high thermal stability and low flammability. However, phenolics suffer from several drawbacks which restrict their utility. Phenolics are generally highly brittle, hence have low impact strength. In the prior art, attempts have been made to remedy or improve some of the drawbacks by utilizing various modifiers such as additives, plasticizers and fillers or by modifying the chemical structure of phenolics. The modifiers proposed in the art include a variety of classes of materials ranging from natural oils to thermoplastics, and vary depending on the properties to be improved. In many cases success has been spotty, and some properties are improved, while other properties have deteriorated. The use of plasticizers, thermoplastics or elastomers in phenolic resins has been successful to some degree in improving the flexibility of phenolic resins. However, those materials are required in large amounts, often exceeding the amount of phenolic resin. Addition of these large amounts of additives results in a deterioration in properties, such as a deterioration in material (mechanical) strength, heat and chemical resistance mainly because of phase separation due to poor compatibility between the additives and the phenolic resin. Use of compatable modifiers have lessened the adverse impact, however, problems still remain.

As means of improving phenolic resin properties, there have been proposed numer of setting type compositions formed by incorporating various reinforcing materials including various types of polyamide resins. For example, U.S. Pat. Nos. 4,173,290 and 3,496,248; Japanese Patent Publication Nos. 59/159,872; 59/133,045; and 55/108,482; and USSR. Patent Publication Nos. 730,750 describe various adhesive compositions in which a phenolic resin and a polyamide resin are used. Japanese Patent Publication No. 49,001,814 describes methods of preparing phenolic fibers containing a polyamide for improved spinnability and tenacity. Also, Japanese Patent Publication No. 58/176,236 describes phenolic compositions containing a polyamide resin for improved moldability and improved properties.

Polyamides are well known and defined as polymers which contain recurring amide groups (—CO—NH—) in the main polymeric backbone. There are two types of synthetic polyamides, i.e., those prepared from a diamine and a diacid; and those prepared from an amino acid or amino acid derivatives. Nylon 66 is an example of the first type, and nylon 6 is an example of the second type. Depending on the starting materials, various polyamide structures are possible. The properties of polyamides vary depending on the structure. The linear aliphatic polyamides are capable of fiber formation and are thus widely used for fiber production. Such linear aliphatic polyamides are also used as engineering plastics. Various aromatic polyamides have been used in high temperature applications because of superior thermal stability as compared to the linear aliphatic polyamides.

Various references disclose mixtures containing phenol formaldehyde and polyamide resins. For example, USSR Pat. No. 639,831 describes a concrete mixture containing phenol formaldehyde and polyamide resins and furfuryl alcohol. U.S. Pat. No. 4,244,858 describes auto extinguishing thermoplastic polyamide compositions containing a polyamide, an alkali and/or ammonium polyphosphate, mineral reinforcing agents and/or fillers and phenol-aldehyde resin. USSR Pat. No. 634,968 describes a material containing phenolshalinphenolformaldehyde resin, silvery graphite, polyamide resin and sawdust which is useful as an antifriction self-lubricating molding material. U.S. Pat. No. 4,110,277 describes the production of an infusible phenolic fiber by melt-spinning a fusible uncured phenol-(pain) formaldehyde resin followed by curing the product at least to the point of infusibility, the improvement comprises incorporating into the resin prior to the spinning 5–30% of an aliphatic nylon. Germany No. 2800467 describes a self-extinguishing thermoplastic polyamide composition containing 40–95 wt% polyamide, 0–50% reinforcing agent and/or filler, 0.5 to 20 wt% phenol aldehyde condensation resin, 0.2–12 wt% phosphoryl nitride oxide and/or precursors of phosphoryl nitride containing 20-50% phosphorus, 15-23% Nitrogen, 45-26.2% oxygen, 12-0% carbon and 8-0% hydrogen. Japan Pat. No. 50/142,816 describes blends of 50-99 wt% thermoplastic phenolic resins, and 1 to 50 wt% polyamide which are melt spun and crosslinked to give fire-resistant infusible fibers, and Japan Pat. No. 51/109057 describes molding compositions of improved nonflammability manufactured from aromatic polyamides, phosphorus containing phenol resins and at least one amide solvent. Japan No. 51/073559 describes polyamide compositions containing 1-90 parts by weight of a phenol-formation low-condensate and 100 parts by weight of a polyamide resin, and Japan No. 55/147556 describes a thermosetting resin molding material containing a thermoset resin such as a phenol resin, melamine resin, and urea resin, and a nylon type plasticizer. Japan No. 57/003877 describes a thermoset adhesive comprising an alcohol soluble polyamide resin, alcohol soluble phenol resin, water soluble epoxy resin and a curing agent for water-soluble epoxy resin and Germany No. 2700092 describes phenol-formaldehyde resin and polyamide terpolymer impregnated prepegs with reduced flame spread, smoke formation and toxic gases on burning. Japan No. 48/072413 describes fibers of phenolic resin blends comprising novolak resins and 3 to 30% of a polyamide, polyurethane or cellulose derivative. Mixtures or adducts containing polyamide or polyepoxide resins are known. For example, U.S. Pat. No. 3,462,337 describes adhesive compositions which comprise a synthetic linear polyamide and polyepoxide for use as side seam adhesive for metal cans.

SUMMARY OF THE INVENTION

One aspect of the present invention relates to curable "precured" compositions comprising a blend of one or more phenolic resins, one or more thermoplastic polymers having active hydrogens, and one or more curing agents, said agents comprising functionalities capable of reacting with said active hydrogens of said polymers and comprising functionalities capable of curing said phenolic resins by reacting with same to form a cured composition in which said resins are bonded to said polymers by way of residues of said agent resulting from reactions between said functionalities and said polymers and said resins. Another aspect of this invention relates to "partially cured," "completely cured," and "incompletely cured" compositions formed by curing the phenolic resin contained in the composition of this invention to varying degrees. As used herein, an "effective amount" of the one or more thermoplastic polymers is an amount which is sufficient to increase the moduli and/or glass transition temperature of the phenolic resin and/or the polymer to any extent. As used herein, "completely cured" compositions are those in which less than about 20 mol percent of the original curable groups in the phenolic resin remain unreacted as determined by the method of infrared spectrophotometry; "precured" compositions are those in which substantially about 100 mol percent of the original curable groups in the phenolic resin are unreacted as determined by the method of infrared spectrophotometry; "partially cured" compositions in the phenolic resin are those in which up to about 60 mol percent of the original curable groups are unreacted as determined by infrared spectrophotometry; and "incompletely cured" compositions are those in which from about 40 mol percent of the original curable groups in the phenolic resin are unreacted as determined by infrared spectrophotometry.

Recently, we have discovered that blends of active hydrogen containing polymers and phenolic resins can be cured using curing agents, such as an epoxy or isocyanate compounds, which cure the resins by reacting with said resins and which react with the active hydrogens of the polymer to form a true interpenetrating polymer network which offers several advantages over the simply cured phenolic portion of the blends.

The curable compositions of this invention are characterized by improved thermal properties, such as improved heat stability; improved chemical resistance; improved resistance to water absorption; and improved mechanical properties, such as improved moduli, improved rigidity, improved toughness, improved creep resistance, and improved impact resistance as compared to the phenolic resins. More importantly, this type of curing does not involve any volatiles which has been one of the major problems in the conventional phenolics curing and requires very low pressure. The composition of the invention can contain particulate and fibrous fillers, and other additives which can be selected from a wide variety of organic and inorganic materials known to those of skill in the art.

The compositions of the invention can be used for a number of purposes. For example, these compositions can be used as a molding compositions in various shaping processes such as injection, compression, transfer, extrusion and pultrusion processes. These materials can be used as structural adhesives and also as matrix materials for composites.

DESCRIPTION OF THE PREFERRED EMBODIMENTS

One aspect of this invention relates to curable compositions comprising blends of one or more phenolic resins, one or more thermoplastic polymers having active hydrogens and one or more curing agents which are capable of reacting with the active hydrogens and capable of curing said resins to form a composition in which said resins are bonded to said polymer by way of residues of said curing agent. Phenolic resins for use in the practice of this invention may vary widely. Illustrative of useful phenolic resins are those of the formula:

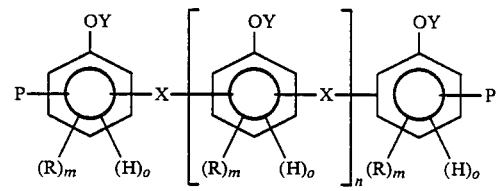

wherein:

P is the same or different at each occurrence and is hydroxyl, hydrogen or methylol;

Y is the same or different at each occurrence and is hydrogen, allyl, glycidyl, cyano or urethane, n is a positive whole number greater than or equal to 1;

m and o are the same or different at each occurrence and are positive whole numbers from 0 to 3, with the proviso that the sum of m and o is 3;

—X— is a divalent organic radical; and

R is the same or different at each occurrence and is a hydroxyl, methylol, or an organic radical.

In the above structural formula, —X— is a divalent organic radical. Illustrative of suitable —X— groups are alkylene such as methylene, ethylmethylene, 2-ethylpentymethylene, methylmethylene, isopropylmethylene, isobutylmethylene, pentylmethylene, furylmethylene, and the like; arylenes such as 1,3-benzenedimethylene, phenylmethylene, 1,4-benzenedimethylene, 2,2-bis-(4-phenylene)propane, 4-methoxyphenylmethylene, bis-(4-phenylene)methane, 4,4-diphenylene dimethylethane and the like; and cycloalkylenes such as cyclohexylene, cyclooctylene, 1,3-cyclohexanldimethylene, and the like.

In the above structural formula, R is hydroxyl, methylol or an organic radical. Illustrative of suitable R groups are such substituents as halogen, trihalomethyl, alkyl, alkoxy, aryl, substituted aryl, hydroxyl, methylol and the like.

In the preferred embodiment of the invention:

—X— is substituted or unsubstituted methylene or substituted 1,4-phenyldimethylene;

m and o are the same or different at each occurrence and are positive whole numbers from 0 to 3, with the proviso that the sum of m and o is 3;

R is the same or different at each occurrence and is alkyl having from 1 to about 8 carbon atoms, phenyl, alkylphenyl having from 7 to about 10 carbon atoms, hydroxyl, halogen, or methylol;

n is a positive number of from 1 to about 20;

P is the same or different at each occurrence and is hydrogen or methylol;

Y is the same or different at each occurrence and is allyl, glycidyl, cyano, or hydrogen.

In the particularly preferred embodiments of the invention:

—X— is methylene, methylene substituted with alkyl having from 1 to 10 carbon atoms, halogen or furfuryl, or xylene;

R is the same or different at each occurrence and is alkyl having from 1 to about 6 carbon atoms;

m is 0 or 1;

n is 1 to about 15;

P is hydrogen;

o is 2 or 3; and

Y is the same or different at each occurrence and is hydrogen, glycidyl, or cyano.

Amongst these particularly preferred embodiments, most preferred are those embodiments wherein n is 1 to about 10;

Y is the same or different at each occurrence and is hydrogen or glycidyl;

m is 0 or 1;

o is 2 or 3;

R is methyl;

—X— is a moiety of the formula:

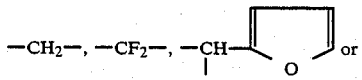

and

P is hydrogen.

The amount of phenolic resin included in the composition of this invention may vary widely. In general, the amount of phenolic resin contained in the composition is from about 1 to about 99 percent based on the total weight of the phenolic and thermoplastic polymer components. In the preferred embodiments of this invention, the amount of phenolic resin contained in the composition is from about 5 to about 95 percent by weight based on the total weight of the phenolic and thermoplastic polymer components; and in the particularly preferred embodiments of the invention, the amount of phenolic resin contained in the composition is from about 10 to about 90 on the aforementioned basis. Amongst these particularly preferred embodiments, most preferred are those embodiments in which the amount of phenolic resin contained in the composition is from about 15 to about 90 percent by weight based on the total weight of the phenolic and thermoplastic polymer components.

The composition also includes one or more thermoplastic polymers having active hydrogens. Illustrative of such polymers are aliphatic and aromatic polyamides, such as diamine/diacid; polyamides, such as nylon 66; 1-amino acid polyamides, such as nylon 6; and terpolyamides, such as nylon 66,6; polyamines, such as diethylenetriamine, triethylenetetramien, m-phenylene diamine, 4,4'-diaminodiphenylmethane and 4,4'diaminodiphenylsulphane; fatty polyamides; polybenzimidazoles; proteins; polyurea; aminopolymers such as urea-formaldehyde, melamine-formaldehyde, benzoguanamine-formaldehyde, and anline-formaldehyde, polyurethanes, such as 4,4'-diphenylmethylene diisocyanate polyurethane, 1,6-hexane diisocyanate polyurethane, 4-methyl-1,3 phenylene diisocyanate polyurethane, methylene diisocyanate polyurethane, polydiene polyurethane, poly(diethylene glycol adipate)urethane, poly(oxypropylene)urethane, and polyurethane block copolymers, poly(urethane urea)elastomers and poly(urethane-isocyanurate)copolymers, and toluene diisocyanate polyurethanes. Illustrative of still other useful thermoplastic polymers and copolymers are carboxyl-containing polymers, such as poly(acrylic acid), poly(L-alanine), poly(glycine), poly(ethylene-co-acrylic acid), poly(ethylene-co-methacrylic acid), poly(methacrylic acid) and its copolymers; hydroxyl containing polymers such as cellulose and its derivatives, p-hydroxybenzic acid-formaldehyde p-bromoaniline copolymer, poly(vinyl alcohol), and silicon.

Preferred thermoplastic polymers for use in the practice of this invention are polyamides. Preferred polyamides for use in the practice of this invention may vary widely. Illustrative of preferred polyamides which may be utilized in the practice of this invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formulas:

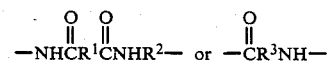

in which $R^1$ is an alkylene group of at least two carbon atoms, preferably from about 2 to about 10; and $R^2$ and $R^3$ are the same or different and are selected from $R^1$, cycloalkylene, and phenylene groups. Also, included are copolyamides and terpolyamides obtained by known methods, as for example, by condensation of hexamethylene diamine and a mixture of dibasic acids consisting of terephthalic acid and adipic acid. In addition to the above polyamides, also useful are polyamides obtained from amino acids and derivatives thereof, as for example lactams.

Polyamides of the above description are well-known in the art and include, for example, the copolyamide of 30% hexamethylene diamminium isophthalate and 70% hexamethylene diammonium adipate, the copolyamide of up to 30% bis-(p-amidocyclohexyl) and methylene, terephthalic acid and caprolactam, polyhexamethylene adipamide (nylon 66), poly(butyrolactam) (nylon 4), poly(anantholactam) (nylon 7), poly(capryllactam) (nylon 8), polycaprolactam (nylon 6), polyhexamethylene sebacamide (nylon 610), polyaminoundecanamide (nylon 11), polydodecanolactam (nylon 12), polyhexamethylene isophthalamide, polyhexamethylene terephthalamide, polycaproamide, or combinations thereof. The polyamide for use in the most preferred embodiments of this invention is nylon 6, nylon 66, nylon 69, nylon 4 or an aromatic polyamide such as poly(hexamethylene terephthalamide).

The amount of thermoplastic polymer may vary widely. In general, the amount of polymer contained in the composition is from about 1 to about 99 weight percent based on the total weight of the phenolic and polymer components. In the preferred embodiment of the invention, the amount of polymer contained in the composition is from about 5 to about 95 weight percent based on the total weight of the phenolic and polymer components, and in the particularly preferred embodiments of the invention the amount of polymer is from about 10 to about 90 on the aforementioned basis. Amongst these particularly preferred embodiments most preferred are those embodiments in which the amount of polymer is from about 15 to about 90 weight percent based on the total weight of the phenolic and polymer components.

As a third essential component, the blend of this invention includes curing agent containing functionalities which can promote the curing of the phenolic resin by reacting with the hydroxyl group of the resin, and containing functionalities which react with the active hydrogen of the thermoplastic polymer. As a result, after curing, the residue of the curing agent functions as a linking group, bonding the cured phenolic resin to the polymer. Curing agents useful in the practice of this can vary widely. Illustrative of useful curing agents are epoxides, isocyanates, cyanates, anhydrides, acid halides, and the like.

Preferred for use in the practice of this invention as curing agents are epoxides, cyanates and isocyanates, and particularly preferred for use in the practice of this invention are epoxides. In these particularly preferred embodiments, the particular epoxide selected for use will depend on such factors as the properties desired in the polymer, cost, reactivity, commercial availability and also on practical as well as theoretical considerations. The epoxides can be saturated or unsaturated, or aliphatic, cycloaliphatic, aromatic or heterocyclic epoxides, having at least two epoxide functionalities of the formula:

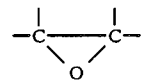

wherein the open valencies are substituted with organic radicals as for example organic radicals selected from saturated or unsaturated aliphatic, cycloaliphatic, aromatic and heterocyclic structures which may be substituted with epoxide functions such as alkylene, substituted alkylenes, alkyleneoxy, alkenylene, substituted alkenylene, arylene, substituted arylene, and aliphatic and aromatic amines, imides, ester, ethers, isocyanurate, and the like.

Useful and preferred epoxides include glycidyl ethers derived from epichlorohydrin adducts of polyols and particularly polyhydric phenols, especially HOArOH wherein Ar is a divalent aromatic organic radical. Illustrative of glycidyl ethers based on $Ar(OH)_2$ are those of the formula:

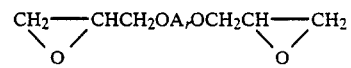

wherein Ar groups include those of the formula:

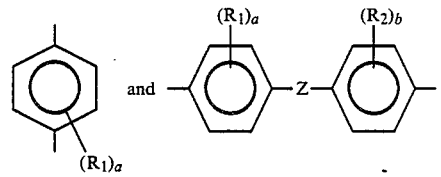

wherein:

a and b are the same or different at each occurence and are integers from 0 to 4;

—Z— is divalent alkylene, such as —C(CH$_3$)—$_2$, methylene, ethylene, propylene, butylene or butylidene; carbonyloxy; alkylamino; amino; oxygen; carbonyl; sulfur; sulfone; and the like; and $R_1$ and $R_2$ are the same are different and are hydrogen, halogen, or a hydrocarbon group, such as aryl, cycloalkyl, alkyl, alkoxy and the like.

The oligomers of these representative glycidyl ethers of dihydric phenols may also be used and may be represented by the formula:

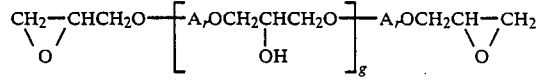

wherein:

g is an integer having a value of greater than 1, preferable from 1 to about 50, and more preferably from 1 to about 10; and Ar is as defined above.

Also, illustrative of epoxides which are useful in the conduct of this invention are the diglycidyl ethers of bisphenol A of the formula:

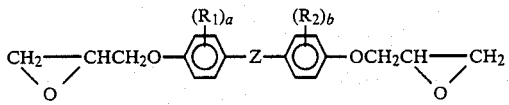

wherein:
—Z—, $R_1$, $R_2$, a and b are as described above. Moreover, in addition to the diglycidyl ethers of bisphenol A described above, various oligomers of these monomers may be used, such as those having the following formula:

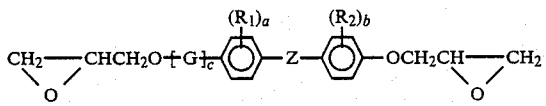

wherein:
c is an integer equal to or greater than 1; and
G is a moiety of the formula:

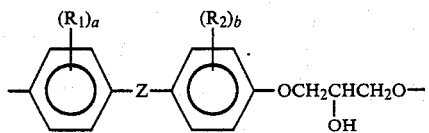

wherein —Z—, $R_1$, $R_2$, a and b are as described above.

Exemplary of other preferred epoxides which may be used in the conduct of this invention are Novolac resins to which an appropriate number of glycidyl groups or other oxirane radicals have been attached. Illustrative of these epoxides are those of the formula:

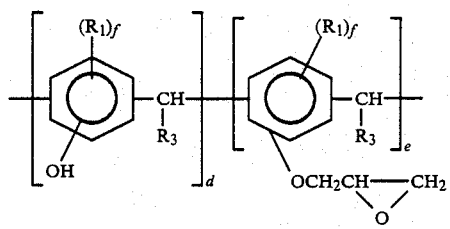

wherein:
d and e are the same or different at each occurence and are integers representing phenyl moieties having appropriate numbers of hydroxy and oxirane;
f is the same or different at each occurence and is an integer from 0 to about 3; and
$R_1$ and $R_3$ are the same or different at each occurence and are hydrogen, halogen or a hydrocarbon radical of 1 to about 10 carbon atoms, preferably 1 to about 6 carbon atoms, such as alkyl, as for example, methyl, ethyl, propyl, butyl, amyl or hexyl; aklenyl, such as allyl, or butenyl, aryl such as tolyl and phenyl; cycloalkyl such as cyclohexyl and methylcyclohexyl; and the like. Where there are only a few benzenoid repeating units, d may be zero and all of the hydroxy groups in the Novolac resin may be replaced by oxirane radicals. As the number of benzenoid radicals increases, the relative proportion of oxirane radicals to hydroxyl groups may be decreased or increased as desired in accordance with the number of attachments to be made to the active hydrogen containing polymer. In the Novolac resins substituted benzenoid radicals may also be used as well as polynuclear benzenoid radicals. In the above formulas the sum of the d and e integers may go as high as about 50 or more and when all of the hydroxy groups are substituted by glycidyl groups in which d will have a value of 0.

Thus, such oligomeric Novolac oxirane-containing compositions may be represented by the formula:

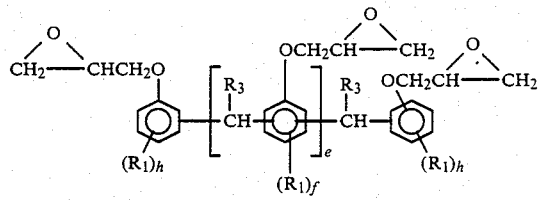

wherein;
$R_1$, $R_3$ and f are as defined above;
h is the same or different at each occurrence and is an integer from about 0 to about 4; and
e is an integer from 1 to about 50, preferably from 1 to about 20. When e is one, the oligomeric Novolac glycidyl ether will contain three epoxy groups per molecule. Illustrative of suitable $R_1$ and $R_3$ are hydrogen, halogen and hydrocarbon groups such as alkyl, alkenyl, alkynyl, cycloalkyl, aryl, alkylaryl, alkenylaryl, cycloalkylaryl, aralkyl and the like. The typical members of these groups are well known and illustrated in the literature. $R_1$ and $R_3$ are preferably hydrogen or alkyl such as methyl, ethyl, propyl, butyl, amyl, hexyl, and the like.

Another class of suitable polyepoxide reactants comprises the polyglycidyl ether-terminated organic polyhydric alcohols having molecular weights from about 100 to about 4,000, and particularly from about 150 to about 1,000. The polyhydric alcohols, for example having two or three hydroxy groups, are preferably: poly(oxyalkylene) glycols; alkylene oxide adducts of aliphatic polyols; and polyhydroxy phenolic compounds. The alkylene groups of the poly(oxyalkylene)glycols and alkylene oxides will usually have from about two to about four carbon atoms, and particularly from about two to about three carbon atoms. The poly(glycidyl ether) terminated polyhydric alcohols (polyols) can be represented by the formula:

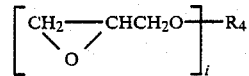

wherein i is an integer equal or greater than about 2, such as 2, 3 or 4; and $R_4$ represents the polyol residue after removal of terminal hydroxy groups. The diglycidyl ether of bis-phenol A is a satisfactory example of such polyepoxides, as shown in the formula given hereinabove. Illustrative of other polyglycidyl ethers of polyols of the above formula, there can be mentioned those prepared by the reaction of about two moles of epichlorohydrin with one mole of a polyethylene glycol or polypropylene glycol as for example such as glycol having a molecular weight of about 200, 400 or 800, or with one mole of tetramethyleneglycol, tetrapropylene glycol and the like, respectively, or about three moles of epichlorohydrin with trimethylol propane or its adducts with ethylene or propylene-oxide, etc.

Additional examples of other polyepoxides are: resorcinol diglycidyl ether, 3,4-epoxy-6-methylcyclohexylmethyl-9,10-epoxystearate, 1,2,-bis(2,3-epoxy-2-methylpropoxy)ethane, the diglycidyl ether of 2,2(p-hydroxyphenyl) propane, butadiene dioxide, dicyclopentadiene dioxide, pentacrythritol tetrakis(3,4-epoxycyclohexanecarboxylate), vinylcyclohexene dioxide, divinylbenzene dioxide, 1,5-pentadiol bis(3,4-epoxycyclohexanecarboxylate), ethylene glycol bis(3,4-epoxycyclohexanecarboxylate), 2,2-diethyl-1,3-propanediol bis(3,4-epoxycyclohexanecarboxylate), 1,6-hexanediol bis(3,4-epoxycyclohexanecarboxylate), 2-butene, 1,4-diol bis(3,4-epoxy-6-methylcyclohexanecarboxylate), 1,1,1-trimethylolpropane tris (3,4-epoxycyclohexanecarboxylate), 1,2,3-propanetriol tris(3,4-epoxycyclohecanecarboxylate), dipropylene glycol bis (2-ethylexyl-4,5-epoxycyclohexane-1,2-dicarboxylate), diethylene glycol bis (3,4-epoxy-6-methylcyclohexanecarboxylate), triethylene glycol bis(3,4-epoxycyclohexanecarboxylate), 3,4-epoxycyclohexylmethyl 3,4-epoxycyclohexanecarboxylate, 3,4-epoxy-1-methylcyclohexylmethyl 3,4-epoxy-1-methylcyclohexanecarboxylate, bis(3,4-epoxycyclohexylmethyl) pimelate, bis(3,4-epoxy-6-methylenecyclohexylmethyl) maleate, bis(3,4-epoxy-6-methylcyclohexylmethyl) succinate, bis(3,4-epoxycyclohexylmethyl)oxalate, bis (3,4-epoxy-6-methylcyclohexylmethyl) sebacate, bis(3,4-epoxy-6-methylcyclohexylmethyl) adipate, bis(3,4-epoxycyclohexylmethyl) terephthalate, 2,2'-sulfonyldiethanol bis(3,4-epoxycyclohexanecarboxylate), N,N'-ethylene bis(4,5-epoxycyclohexane-1,2-dicarboximide), di(3,4-epoxycyclohexylmethyl) 1,3-tolylenedicarbamate, 3,4-epoxy-6-methylcyclohexanecarboxaldehyde acetal, 3,9-bis (3,4-epoxycyclohexyl)spirobi-(methadioxane),

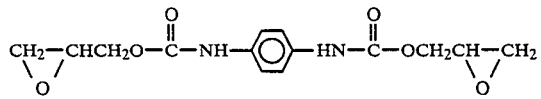

and the like.

Organic compounds containing two or more epoxide functions can be obtained commercially or prepared in accordance with conventional procedures. For example, such compounds can be prepared in accordance with the procedure of U.S. Pat. Nos. 2,494,295, 2,521,911, and "Handbook of Epoxy Resins," by H. Lee and K. Neville, McGraw-Hill, 1967.

In addition to the preferred polyepoxide compounds described in the preceding section, any compound containing functional groups reactive to the active hydrogen atoms of the hydroxyl groups present in the phenolic resin, and the active hydrogen in the thermoplastic resin, such as polyisocyanates and polycycanates can be used in the practice of this invention. Illustrative of polyisocyanates which may be utilized in the practive of this invention are aromatic and aliphatic polyisocyanates, isocyanate-terminated adducts and polymers. Typical examples of aromatic polyisocyanates includes isomers of toluene diisocyanate (TDI) and 4,4'-diphenyl methane diisocyanate (MDI), modifications of these products especially "crude" TDI is MDI, meta or paraphenylene diisocyanate, 1-chloro-2,4-phenylene diisocyanate, 3,3'-dimethyl-4,4'-bisphenylene diisocyanate, 3,3'-dimethoxy-4,4'-bisphenylene diisocyanate, 4,4'-bis(2,methylisocyanotophenyl) methane, 4,4'-bis(2-methoxyisocyanotophenyl methane) and the like. Aliphatic isocyanates useful in the conduct of this invention include 1,6-hexamethylene diisocyanate, isophorone diisocyanates, dimeryl diisocyanates, hydrogenated TDI and MDI, lysine diisocyanates, and the like. The isocyanate-terminated adducts and polymers are formed in reactions of hydroxyl containing polyethers and/or polyesters and diisocyanates in polyisocyanates.

Organic compounds containing two or more isocyanate functions can be obtained from commercial sources or prepared by conventional procedures. For example, useful compounds can be prepared in accordance with the procedures described in J. H. Saunders and K. C. Frisch "Polyurethanes, Parts I and II", interscience, N.Y. (1962).

Illustrative of useful polycyanates are aromatic and aliphatic poly(cyanic acid esters). Typical examples include 4,4'-dicyanatobiphenyl, bis(4-cyanate phenyl) methane, 1,1-bis(4-cyanate phenyl) ethane, 2,2-bis(4-cyanate phenyl) propane, bis(4-cyanatephenyl) ether, bis(4-cyanate phenyl) sulfur, and novolac type phenolic resins containing cyanic acid ester groups. Such materials can be obtained form commercial sources or can be prepared in accordance with known procedures, as for example the procedures of U.S. Pat. Nos. 3,553,244; 3,595,900; 3,649,714; 3,994,949; 4,046,796; 4,026,913; 4,157,360; 4,650,838; and 4,650,839, and German patent specification No. 1503272.

The amount of the curing agent may vary widely depending on a number of factors, as for example equivalent weight of the agent, type of reactive groups, structure of the agent, and like. The amount of the curing agent used is calculated from the stiochiometry which is expressed as "phr" (parts by weight of curing agent per 100 parts by weight of the blend). Usually, the greater the amount of the curing agent used, the greater the glass transition temperature and/or the greater the moduli of the resulting blend. Conversely, the less the amount of the agent used, the lower the glass transition temperature and/or the lower the moduli of the resulting blend. In general, an amount of agent is used which is sufficient to increase the glass transition temperature and/or moduli to any extent. Usually, the amount of the curing atent is at least about 0.5 phr. In the preferred embodiments of the invention, the amount of curing agent is from about 2 to about 250 phr, and in the particularly preferred embodiments of the invention is from about 10 to about 200 phr. Amongst these particularly preferred embodiments most preferred are those in which the amount of curing agent is from about 20 to about 150 phr.

The composition of this invention may include a number of optional ingredients. Such optional components include fillers, plasticizers, impact modifiers, colorants, mold release agents, antioxidants, ultraviolet light stabilizers, lubricants, antistatic agents, fire retardants, and the like. These optional components will not be described herein in detail.

A reinforced and/or filled composition comprising the completely cured, partially cured, incompletely cured and precured compositions of this invention, which may be used in the preparation of such reinforced compositions are also part of the invention disclosed herein. The completely cured, precured, partially cured, and incompletely cured compositions as described, may contain fillers for use in where the structural strength and integrity of a structure has to be maintained, and for other purposes known to those of skill in the art. Any suitable filler known to those of skill in the art can be used. Such fillers may be selected from a wide variety of organic and inorganic materials such a polymers, minerals, metals, metal oxides, siliceous materials and metal salts. Illustrative of useful fillers are fiber glass, steel, asbestos fibers, aramide, boron and carbon fibers, as well as plate like, fibrous and particulate forms of alumina, brass powder, aluminum hydrates, iron oxide, feldspar, lead oxides, asbestos, talc, barytes, calcium carbonates, clay, carbon black, quartz, nocaculite and other forms of silica, koalinite, aluminum silicate bentonite, garnet, mica, saponite, beidelite, calcium oxide, fused silica, calcium hydroxide, and the like.

The foregoing recited fillers are illustrative only and are not meant to limit the scope of the fillers that can be utilized in this invention. Methods for producing reinforced and/or filled compositions include melt blending, extrusion and molding processes, simple mixing and dispersion of both materials in suitable medium by methods known in the art.

The composition of this invention can be prepared employing conventional blending and curing techniques. For example, processes for producing the completely cured, precured, partially cured and incompletely cured compositions are also a part of this invention, and include both a solution process and a melt process. For example, in the solution process for preparation of the composition containing the completely cured, partially cured or incompletely cured crosslinked phenolic resin having an effective amount of one or more active hydrogen containing polymer dispersed therein, a solution of the active hydrogen containing polymer and precured phenolic resin, as described herein, is formed in a suitable solvent. To the solution is added a suitable curing agent. The solvent is then removed from the solution at a rate to cause simultaneous precipitation of the active hydrogen containing polymer and the phenolic resin thereby producing an intimate mixture of said active hydrogen containing polymer and resin, forming the precured composition of this invention as described above. Heating the resulting intimate mixture of polyamide, phenolic resin and curing agent at a temperature above about 150° C. and preferably above about 200° C., will promote the curing process to form the completely cured, incompletely cured or partially cured composition of this invention.

Solvents useful in the solution process are those having good solubility for the active hydrogen containing polymer, phenolic resin and the curing agent. Representative solvents include formic acid, m-cresol, phenol, ethylene carbonate, trichloroacetic acid, chlorophenol, dimethylphenol, trifluorothanol, trifluoroacetic aldehyde, ethylene carbonate, and the like.

The solution of the phenolic resin alone, or of the phenolic resin and the active hydrogen containing polymer, preferably contains from about 5 to about 40 weight-volume percent of the solvent. It is most preferred to employ solutions of the phenolic resin and active hydrogen containing polymer wherein each are present in about 5 to about 25 weight-volume percent.

Solvent removal from the solution of the active hydrogen containing polymer and phenolic resin can readily be accomplished by evaporation, atmospheric distillation, vacuum distallaton or freeze drying, techniques well known in the art. It is preferred to use evaporation or vacuum distillation as the means for removing solvent.

Further, a process is provided for producing the compositions of this invention in a melt process. For example, such a process for preparation of the composition comprising the partially, completely, or incompletely cured phenolic resin having dispersed active hydrogen containing polymer comprises mixing a phenolic resin and an active hydrogen containing polymer in a suitable mixer, as for example a Branbury Mixer or the like, as uniformly as possible; or alternatively mixing an active hydrogen containing polymer into molten phenolic resin or mixing a phenolic resin into molten active hydrogen containing polymer, thereby providing the precured composition of this invention which is an intimate mixture of said active hydrogen containing polymer and phenolic resin. The precured composition may then be heated at a temperature 150° C., preferably above about 200° C., in the presence of a suitable curing agent or catalyst if required to yield a partially cured, a completely cured or an incompletely cured composition as discussed above.

A composition of said active hydrogen containing polymer and phenolic resin in the process may be obtained in several ways, such as by melt blending of a solid mixture of the two or by a melt extrusion process. In a melt extrusion process, the conditions can be regulated such that the material is mixed, melted and extruded at a temperature above the melting point of the phenolic resin and below about 300° C. over varying time periods, thus forming partially cured, completely cured, or incompletely cured compositions of this invention.

The procured, completely cured, incompletely cured and partially cured compositions of this invention are useful in forming a wide variety of industrial products, including shaped articles as produced by known shaping processes. Precured compositions can be formed (i.e., shaped) into articles which can then be cured to form completely cured, incompletely cured and partially cured articles. Shaped articles produced from the polymer composition include windscreens such as windshields, canopies, door windows and wire housing. The shaping process can be any process known to one skilled in the art, such as injection, blow or extrusion molding.

The completely cured composition of this invention may also be deposited on an article and used as a coating material. The article may be any useful article including wires, structural parts and the like. Methods of depositing said cured composition on any article may be by applying pre-cured partially cured or incompletely cured composition of the invention neat, or in solution followed by evaporation of the solution to the article and subjecting said composition to curing by heating above about 200° C. to form the completely cured composition.

The following specific examples are presented to more particularly illustrate the invention and are not to be construed as limitations thereon.

EXAMPLE I

A mixture of a nylon 6, commercially available from Allied-Signal, Inc. under the tradename of Capron TM BAT, and a cresol novolac sold by BTL Specialty Resins Corp. under the tradename of 29-801 Varcum (5350-LM), was prepared at a ratio of nylon 6 to novolac 50 to 50 by weight. The mixture is then melt-blended in a Leistritze twin screw extruder and pelletized. The screw speed was about 85 revolutions per minute (Rpm) and the barrel temperatures were controlled at 50° C., 100° C., 200° C., 240° C., 240° C., 250° C., and 240° C., from zone 1 to zone 7, and the die temperature at 240° C. The pellets made were then ground to a powder form of desired particle size using a Wiley mill or a high shear blender such as the Waring blender. To 100 parts of the powder, 6.4 parts of an epoxy resin, a diglycidyl ether bisphenol A resin, commercially available from Shell Chemical under the tradename of Epon 1001F were added. The mixture of these ingredients was then uniformly mixed using a high shear blender such as the Waring blender. The sample of the mixed powder was cured by compression molding at about 200° C. for about 5 minutes. The molded plaque was strong, rigid, and transparent. The tensile strength, elongation and tensile modulus of this composition were evaluated by ASTM D-638. The glass transition of the cured material was determined by a dynamic mechanical analyzer at a frequency of 1 Hz and under the temperature scanning rate of 3° C./min. The results are as set forth in the following Table I.

TABLE I

| Property | Value |
| --- | --- |
| Tensile Strength | |
| at yield (psi) | 6008.4 |
| at break (psi) | 6008.4 |
| Elongation at break (%) | 1.80 |
| Tensile Modulus ($10^3$ psi) | 355.0 |
| Tg, °C. | 70° C. |

It is noted that the cured resin exhibits one single $T_g$ suggesting that it is a homogeneous blend.

EXAMPLE 2

The procedures of Example 1 were repeated for making samples for water absorption test, which were also repeated for making Capron ™ BAT nylon 6 samples for water absorption test. The sample specimens which were cut from the molded plaques to dimensions of $2'' \times 2'' \times \frac{1}{8}''$ first dried in a vacuum oven under vacuum at 80° C. for 2 days to remove volatiles before the test. The specimens were then immersed in boiling water for 92 hours, and measurement was made at desired time. The percentage of water absorption is calculated by multiplying 100% by the difference in sample weights before and after immersion divided by the initial weight. The results are as set forth in the following Table II.

TABLE II

| Time of Immersion (hrs) | Capron BAT Nylon 6 (Wt. %) | Sample of Example 2 (Wt. %) |
| --- | --- | --- |
| 0.5 | 2.32 | — |
| 1.0 | 3.35 | 1.24 |
| 2.0 | 4.97 | 1.79 |
| 3.0 | 6.50 | 2.16 |
| 4.0 | 7.38 | 2.42 |
| 24.0 | 10.46 | 3.20 |
| 48.0 | 10.37 | 3.58 |
| 72.0 | 10.40 | 3.54 |
| 92.0 | 10.61 | 3.50 |

As seen from this example, the water absorption of the nylon/phenolic blend cured with epoxy is much lower than that of the nylon polymer.

EXAMPLE 3

The procedures of Example 1 were repeated for a different epoxy resin, 4-glycidyoxy-N, N-diglycidylaniline, sold by Ciba-Geigy Corporation under the tradename of Araldite MY0510. It is a liquid epoxy resin and the procedures used in Example 1 was modified in the following manner to disperse the material uniformly into the blends. In a one liter container, 2 parts of acetone was added to 10 parts of epoxy resin to reduce the viscosity of the epoxy resin. The mixture was vigorously stirred by a motor-driven stirrer or a magnetic stirrer. 500 parts of the fluorohydrocarbon solvent, sold by Allied Corporation under the tradename of Geneton G113 was added to the solution and the mixture was stirred vigorously in a high intensity mixer to form a milky colour emulsion. To the emulsion was added slowly 100 parts of the ground nylon/phenolic blend with composition of nylon 6 to cresol novolac of 50 to 50 by weight prepared in Example 1. The mixture was dried at room temperature in a vacuum oven for 18 hours. The sample of the mixed powder was cured by compression molding at about 200° C. for about 5 minutes. The molded part was clear, strong, and rigid. Only one glass transition for the cured plaque was found at 86° C. using the dynamic mechanical analyzer under the conditions described in Example 1 indicating the material is a homogeneous blend.

EXAMPLE 4

The procedure of Example 3 was repeated with the exception that 0.1 part of a tertiary amine catalyst was used. The catalyst is p,p'-tetramethyldiaminodiphenylmethane sold by ICN Pharmaceuticals, Inc. One single Tg of the molded plaque was found at 86° C. using the dynamic mechanical analyzer under the conditions described in Example 1 revealing that is a homogeneous blend.

EXAMPLE 5

The procedure of Example 3 was repeated with the exception that 20 parts of the epoxy resin was used in the composition. The sample of the mixed powder was cured by compression molding at about 200° C. for about 5 minutes. The molded plaque was strong, rigid, and transparent. The tensile strength, elongation, and tensile modulus of this composition were evaluated by ASTM D-638. The glass transition of the cured material was determined by the dynamic mechanical analyzer under the conditions described in Example 1. The results are as set forth in the following Table III.

TABLE III

| Property | Value |
| --- | --- |
| Tensile Strength | |
| at yield (psi) | 7344 |
| at break (psi) | 7344 |
| Elongation at break (%) | 2.00 |
| Tensile Modulus ($10^3$ psi) | 389 |
| Tg, °C. | 99.0 |

The material exhibits a single $T_g$ indicating it is a homogeneous blend.

EXAMPLE 6

The cured sample prepared in Example 5 was postcured for 2 hours at 210° C. under vacuum. One single glass transition of the post-cured material was determined at 103° C. using the dynamic mechanical analyzer under the conditions described in Example 1 indicating the material is homogenous blend and phase separation was not observed.

EXAMPLE 7

The procedure of Example 6 was repeated with the exception that the cured sample was post-cured for 18 hours at 210° C. The single glass transition of the post-cured material was found at 97° C. indicating some material property changed due to oxidation and degradation.

EXAMPLE 8

The procedure of Example 3 was repeated with the exception that 40 parts of the epoxy resin was used in the composition. The sample of the mixed powder was cured by compression molding at about 200° C. for about 5 minutes. The molded plaque was strong, rigid and quite transparent. The tensile strength, elongation, and tensile modulus of this composition were evaluated by ASTM D-638. The glass transitiion of the molded sample which was post-cured at 210° C. for 2 hours was determined by the dynamical mechanical analyzer under the conditions described in Example 1. The results are as set forth in the following Table IV.

TABLE IV

| Property | Value |
| --- | --- |
| Tensile Strength | |
| at yield (psi) | 4460 |
| at break (psi) | 4460 |
| Elongation at break (%) | 1.20 |
| Tensile Modulus ($10^3$ psi) | 375 |
| Tg, °C. | 127.0 |

The material exhibits a single $T_g$ indicating it is a homogeneous mixture or blend.

EXAMPLE 9

The procedure of Example 3 was repeated with the exception that 100 parts of the epoxy resin was used in the composition. The sample of the mixed powder was cured by compression molding at about 200° C. for 5 minutes. The molded plaque was strong, rigid, and very transparent. The tensile strength, elongation, and tensile modulus of this composition were evaluated by ASTM D-638. The glass transition of the molded sample which was post-cured at 210° C. for 2 hours was determined by the dynamic mechanical analyzer under the conditions described in Example 1. The results are as set forth in the following Table V.

TABLE V

| Property | Value |
| --- | --- |
| Tensile Strength | |
| at yield (psi) | 4694.8 |
| at break (psi) | 4694.8 |
| Elongation at break (%) | 1.2 |
| Tensile Modulus ($10^3$ psi) | 383 |
| Tg, °C. | 217.0 |

Similarly, the material exhibits a single $T_g$ indicating it is a homogeneous mixture or blend.

EXAMPLE 10

The procedure of Example 3 was followed with the exception tha the ratio of nylon 6 to novolac was 75 to 25. The extruder barrel temperatures were at 50, 50, 180, 220, 220, 240, 240, the die temperature was 230° C. The amount of epoxy resin used was 20 parts. The composition was compression molded at 220° C. for 5 minutes. The tensile strength, elongation, and tensile modulus of this composition were evaluated by ASTM D-638. The glass transition of the molded sample which was post-cured at 210° C. for 2 hours was determined by the dynamical mechanical analyzer under the conditions described in Example 1. The results are set forth in the following Table VI.

TABLE VI

| Property | Value |
| --- | --- |
| Tensile Strength | |
| at yield (psi) | 4916 |
| at break (psi) | 4916 |
| Elongation at break (%) | 1.8 |
| Tensile Modulus ($10^3$ psi) | 301 |
| Tg, °C. | 96.0 |

The material is homogeneous because it exhibits a single $T_g$.

EXAMPLE 11

The procedure of Example 3 was followed with the exception that the ratio of nylon 6 to novolac was 10 to 90. The extruder barrel temperatures were at 50, 50, 100, 150, 170, 170, 170, and the die temperature was 170° C. The amount of epoxy resin used was 40 parts. The composition was compression molded at 200° C. for 5 minutes. The tensile strength, elongation, and tensile modulus of this composition were evaluated by ASTM D-638. The glass transition of the molded sample which was post-cured at 210° C. for 2 hours was determined by the dynamical mechanical analyzer under the conditions described in Example 1. The results are set forth in the following Table VII.

TABLE VII

| Property | Value |
| --- | --- |
| Tensile Strength | |
| at yield (psi) | 2261 |
| at break (psi) | 2261 |
| Elongation at break (%) | 0.4 |
| Tensile Modulus ($10^3$ psi) | 439 |
| Tg, °C. | 127° C. |

The material exhibits a single $T_g$, indicating that it is a homogeneous blend.

EXAMPLE 12

The procedure of Example 3 was repeated with the exception that another epoxy resin, N,N,N',N'-tetra-glycidyl-4,4'-methylene bisbenzenamine, sold by Ciba-Geigy Corp. under the tradename of Araldite MY720 was used. The amount of epoxy used was 24 parts. The composition was compression molded at 200° C. for 5 minutes. The tensile strength, elongation, and tensile modulus of this composition were evaluated by ASTM D-638. The glass transition of the molded sample which was post-cured at 210° C. for 2 hours was determined by the dynamical mechanical analyzer under the conditions described in Example 1. The results are as set forth in the following Table VIII.

TABLE VIII

| Property | Value |
| --- | --- |
| Tensile Strength | |
| at yield (psi) | 7169 |
| at break (psi) | 7169 |

TABLE VIII-continued

| Property | Value |
| --- | --- |
| Elongation at break (%) | 2.2 |
| Tensile Modulus (10³ psi) | 349.0 |
| Tg, °C. | 92.0 |

The material is homogeneous because it has a single $T_g$.

EXAMPLE 13

The procedure of Example 1 was followed with the exception that another nylon, poly(trimethyl hexamethylene terephthalamide) sold by Dynamit Nobel, Inc. under the tradename of Trogamid T, was used. The ratio of nylon to novolac was 75 to 25. The extruder barrel temperatures were set at 50, 150, 250, 250, 250, 250, 250, and the die temperature was 250° C. The pellets made without addition of epoxy resin as curing agent were compression molded at 250° C. for 5 minutes after they dried under vacuum at 80° C. for 2 days. The Trogamid T pellets obtained from the manufacturer were compression molded after drying under the same conditions. The tensile stength, elongation, and tensile modulus of this material were evaluated by ASTM D-638. The results are set forth in the following Table IX.

TABLE IX

| | Value | |
| --- | --- | --- |
| Property | Trogamide T | Troagmide T 75 Cresol Novolac 25 |
| Tensile Strength | | |
| at yield (psi) | 6938 | 12911 |
| at break (psi) | 6938 | 12911 |
| Elongation at break (%) | 3.4 | 5.0 |
| Tensile Modulus (10³ psi) | 268.0 | 349.0 |
| Tg, °C. | 145.0 | 133.0 |

From the above results, both materials are homogeneous because they exhibit only a single $T_g$.

EXAMPLE 14

The procedure of Example 3 was repeated for the sample material perpared in Example 13 with the exception that the concentration of epoxy resin used was 11.2 parts. The sample of the mixed powder was cured by compression molding at about 250° C. for about 5 minutes. The molded plaque was strong, rigid, and transparent. The tensile strength, elongation, and tensile modulus of this composition were evaluated by ASTM D-638. The glass transition of the molded sample which was post-cured at 210° C. for 2 hours was determined by the dynamic mechanical analyzer under the conditions described in Example 1. The results are as set forth in the following Table X.

TABLE X

| Property | Value |
| --- | --- |
| Tensile Strength | |
| at yield (psi) | 9427 |
| at break (psi) | 9427 |
| Elongation at break (%) | 3.05 |
| Tensile Modulus (10³ psi) | 338 |
| Tg, °C. | — |

EXAMPLE 15

The procedure of Example 14 was repeated with the exception that the epoxy resin concentration used was 56 parts. The sample of the mixed powder was cured by compression molding at about 250° C. for about 5 minutes. The molded plaque was strong, rigid, and transparent. The tensile strength, elongation, and tensile modulus of this composition were evaluated by ASTM D-638. The glass transition of the molded sample which was post-cured at 210° C. for 2 hours was determined by the dynamic mechanical analyzer under the conditions described in Example 1. The results are as set forth in the following Table XI.

TABLE XI

| Property | Value |
| --- | --- |
| Tensile Strength | |
| at yield (psi) | 9003.4 |
| at break (psi) | 9003.4 |
| Elongation at break (%) | 2.8 |
| Tensile Modulus (10³ psi) | 352 |
| Tg, °C. | 131.0 |

The material is homogeneous because it exhibits a single $T_g$.

EXAMPLE 16

The procedure of Example 13 was followed with the exception that the ratio of nylon (Trogamid T) to novolac was 50 to 50. The extruder barrel temperatures were set at 50, 100, 250, 250, 250, 250, 250, 250, and the die temperature was 250° C. The procedures of Example 3 were repeated for preparation of sample mixture with the exception that the concentration of epoxy resin used was 12.2 parts. The sample of the mixed powder was cured by compression molding at about 250° C. for about 5 minutes. The molded plague was strong, rigid, and transparent. The tensile strength, elongation, and tensile modulus of this composition were evaluated by ASTM D-638. The glass transition of the molded sample which was post-cured at 210° C. for 2 hours was determined by the dynamic mechanical analyzer under the conditions described in Example 1. The results are as set forth in the following Table XII.

TABLE XII

| Property | Value |
| --- | --- |
| Tensile Strength | |
| at yield (psi) | 5164 |
| at break (psi) | 5164 |
| Elongation at break (%) | 1.39 |
| Tensile Modulus (10³ psi) | 374 |
| Tg, °C. | 128 |

The material is homogeneous because it has a single Tg.

EXAMPLE 17

The procedure of Example 6 was repeated. A sample was cut to have dimensions of 1"×¼"×⅛" (thick) for short beam shear strength evaluation. It was found that the short beam shear strength of the material is 2.04 KSl.

EXAMPLE 18

The procedure of Example 5 was repeated with the exception that a graphite mat made by Feberite Corporation sold under a trade name of W-322 Graphite Fabrit (5.71 oz/yd$^2$) was used as a reinforcement material. The amount of fiber used was 36.8 wt%. The mixed powder sample was sprinkled in between each layer of the graphite mat. The total number of layers used was six. The sample of the material was cured by compression molding at about 200° C. for about 5 minutes. The molded plaque was strong, stiff, and tough. The short beam shear strength of the material was found to be 5.47 ksi. The enhancement in the short beam shear strength indicates the interfacial adhesion between fiber and matrix is exceptionally good.

EXAMPLE 19

The procedure of Example 18 was repeated with the exception that the sample was post-cured under vacuum for 2 hours at 210° C. The short beam shear strength of the material was found to be 5.16 ksi.

EXAMPLE 20

The procedure of Example 18 was repeated with the exception that the sample was post-cured under vacuum for 14 hours at 210° C. The short beam shear strength of the material was found to be 6.11 ksi.

What is claimed is:

1. A curable composition comprising a blend of one or more phenolic resins selected from those of the formula:

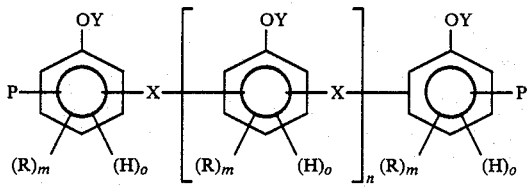

wherein:
P is the same or different at each occurrence and is hydrogen, hydroxyl or methylol;
Y is the same or different at each occurrence and is hydrogen, allyl, glycidyl, cyano or urethane;
n is a positive whole number greater than or equal to 1;
m and o are the same or different at each occurrence and are positive whole numbers from 0 to 3, with the proviso that the sum of m and o is 3;
—X— is a divalent organic radical; and
R is the same or different at each occurrence and is hydroxyl or an organic radical, one or more polymers other than a polyamide at least one of which contains an active hydrogen and an effective amount of a curing agent for promoting the curing of said resins, said agent bonding to said resin and bonding to said polymer during the curing of said resin to form residues which bond said resin to said polymer.

2. A composition according to claim 1 wherein —X— is substituted or unsubstituted methylene, or 1,4-phenyldimethylene.

3. A composition according to claim 1 wherein X is substituted or unsubstituted methylene or 1,4-phenyldimethylene, wherein permissible substituents are alkyl having from 1 to about 10 carbon atoms, halogen and furyl.

4. A composition according to claim 3 wherein X is a moiety of the formula:

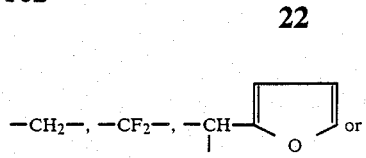

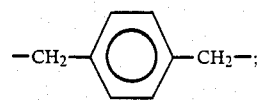

5. A composition according to claim 1 wherein n is from 1 to about 20.
6. A composition according to claim 5 wherein n is from about 1 to 15.
7. A composition according to claim 6 wherein n is from 1 to about 10.
8. A composition according to claim 1 wherein:
m is 0 to 1; and
o is 2 to 3.
9. A composition according to claim 1 wherein:
m is 0; and
o is 3.
10. A composition according to claim 1 wherein R is alkyl having from 1 to about 8 carbon atoms, phenyl, alkylphenyl having from 7 to about 10 carbon atoms, hydroxyl, halogen or methylol.
11. A composition acoding to claim 10 wherein R is alkyl.
12. A composition according to claim 11 wherein R is methyl or ethyl.
13. A composition according to claim 1 wherein the amount of polymers contained in said composition is from about 1 to about 99 weight percent based on the total weight of phenolic and polymer in said composition.
14. A composition according to claim 13 wherein said amount is from about 5 to about 95 weight percent.
15. A composition according to claim 14 wherein said amount is from about 10 to about 90 weight percent.
16. A composition according to claim 15 wherein said amount is from about 15 to about 90 weight percent.
17. A composition according to claim 1 wherein said polymer is selected from the group consisting of amino polymers, polyamines, polybenzimidazoles, protein, poly(amideimide), polyureas, polyurethanes, and polymers having pendant carboxylic and hydroxyl functions.
18. A curable composition comprising a blend of at least about 25 weight percent based on the total weight of the composition of one or more phenolic resins selected from those of the formula:

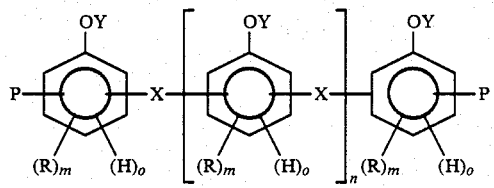

wherein:
P is the same or different at each occurrence and is hydrogen, hydroxyl or methylol;
Y is the same or different at each occurrence and is hydrogen, allyl, glycidyl, cyano or urethane;

n is a positive whole number greater than or equal to 1;

m and o are the same or different at each occurrence and are positive whole numbers from 0 to 3, with the proviso that the sum of m and o is 3;

—X— is a divalent organic radical; and

R is the same or different at each occurrence and is hydroxyl or an organic radical, one or more alcohol insoluble polyamides and an effective amount of a curing agent for promoting the curing of said resin, said agent bonding to said resin and bonding to said polyamide during the curing of said resin to form residues which bond said resin to said polyamide.

19. A composition according to claim 18 wherein said polyamide is selected from the group consisting of polyamides having recurring units of the formula:

$$NHCR^1\overset{O}{\overset{\|}{C}}NHR^2- \quad \text{or} \quad -\overset{O}{\overset{\|}{C}}R^3NH$$

wherein:
$R^1$ is alkylene having at least about two carbon atoms and $R^2$ and $R^3$ are the same or different and are $R^1$, cycloalkylene or phenylene.

20. A composition according to claim 18 wherein $R^1$, $R^2$ and $R^3$ are the same or different and are phenylene or alkyl having from 2 to about 14 carbon atoms.

21. A composition according to claim 20 wherein said polyamides are selected from the group consisting of nylon 66, nylon 69, nylon 610, nylon 4, nylon 6, nylon 7, nylon 8, nylon 11, nylon 12 and a polyamide of the formula in which at least one of $R^1$, $R^2$, and $R^3$ is phenylene.

22. A composition according to claim 21 wherein said polyamides are selected from the group consisting of nylon 66, nylon 69, nylon 4, nylon 6, or a polyamide of the above formula in which $R^1$ and $R^2$ are phenylene.

23. A composition according to claim 22 which comprises said polyamide is polycaprolactam.

24. A composition according to claim 1 wherein said curing agent is selected from the group consisting of organic compounds having at least two functional groups selected from the group consisting of epoxide, isocyanate, cyanate, anhydride, and acid halide.

25. A composition according to claim 1 wherein said curing agent is selected from the group consisting of organic compounds having at least two functional groups selected from the group consisting of epoxide and isocyanate functions.

26. A composition according to claim 25 wherein said curing agent is selected from the group consisting of organic compounds having at least two epoxide functional groups.

27. A composition according to claim 26 wherein said compounds are epihalohydrin adducts of aliphatic, aromatic and heterocyclic compounds having two or more hydroxy functions.

28. A composition according to claim 27 wherein said compound is of the formula:

$$CH_2\overset{O}{\overset{\diagup\;\;\diagdown}{-}}CHCH_2O\!\left[\!R-OCH_2CHCH_2O\!\underset{OH}{\vphantom{|}}\!\right]_{\!g}\!R-OCH_2CH\overset{O}{\overset{\diagup\;\;\diagdown}{-}}CH_2$$

wherein:
g is a natural number equal to or greater than 0; and
—R— is the same or different at each occurrence and is an aromatic moiety selected from the group consisting of:

[structures with $(R_1)_a$ and $(R_2)_b$ substituents, and Z linker]

wherein;
—Z— is a divalent alkylene, carbonyl, carbonyloxy, sulfur, oxygen, amino, alkylamino and sulfone;
$R_1$ and $R_2$ are the same or different at each occurrence and are halogen, alkyl, alkoxy and hydrogen; and
a and b are the same or different at each occurrence and are integers from 0 to 4, wherein the remaining substituents on the phenyl moieties are hydrogen.

29. A composition according to claim 28 wherein g is 0 to about 50.

30. A composition according to claim 29 wherein g is 0 to about 10.

31. A composition according to claim 27 wherein said compounds are epihalohydrin adducts of a novolac resin of the formula:

[novolac resin structure with $R_3$, $(R_1)_h$, $(R_1)_f$ substituents, and indices d, e]

wherein:
f is the same or different at each occurrence and is an integer from 0 to about 3;
h is the same or different at each occurance and is an integer from 0 to about 4;
d and e are the same or different occurrence and are natural numbers from 0 to about 50, with the proviso that the sum of d and e is from 1 to about 50; and
$R_1$ and $R_3$ are the same or different at each occurence and are halogen, hydrogen or a hydrocarbon radical from 1 to about 10 carbon atoms.

32. A composition according to claim 27 wherein said compounds are poly(glycidylether)terminated polyhyric alcohols of the formula:

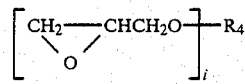

wherein:
i is an integer equal to or greater than 2; and
$R_4$ is residue of an organic polyhydric acid having a molecular weight of from about 100 to about 4000.

33. A composition according to claim 1 wherein the amount of said curing agents is at least about 0.5 phr.

34. A composition according to claim 32 wherein said amount is from about 2 to about 250 phr.

35. A composition according to claim 34 wherein said amount is from about 10 to about 200 phr.

36. A composition according to claim 35 wherein said amount is from about 20 to about 150 phr.

37. A completely cured composition formed by completely curing the composition of claim 1.

38. An incompletely cured composition formed by incompletely curing the composition of claim 1.

39. A partially cured composition formed by partially curing the composition of claim 1.

40. A curable composition comprising a blend of one or more phenolic resins selected from those of the formula:

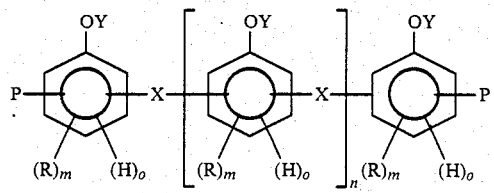

wherein:
P is the same or different at each occurrence and is hydrogen, hydroxyl or methylol;
Y is the same or different at each occurrence and is hydrogen, allyl, glycidyl, cyano or urethane;
n is a positive whole number greater than or equal to 1;
m and o are the same or different at each occurrence and are positive whole numbers from 0 to 3, with the proviso that the sum of m and o is 3;
—X— is a divalent organic radical; and
R is the same or different at each occurrence and is hydroxyl or an organic radical, one or more polymers at least one of which contains an active hydrogen and an effective amount of a curing agent for promoting the curing of the resin, said agent bonding to said resin to form residues which bond said resin to said polymer, said resin formed by melt blending said polymer and said resin to form a polymer and resin blend and melt blending said polymer and resin blend with said curing agent.

41. A curable composition according to claim 18 wherein said curing agent is selected from the group consisting of isocyanates, cyanates, anhydrides and acid halides.

42. A curable composition according to claim 41 wherein said agent is selected from the group consisting of isocyanates and cyanates.

* * * * *